(12) United States Patent
Endo

(10) Patent No.: US 6,256,062 B1
(45) Date of Patent: *Jul. 3, 2001

(54) COLOR CORRECTION APPARATUS FOR MATCHING COLORS IN A SIGNAL OUTPUT FROM A FIRST IMAGE APPARATUS WITH THOSE FROM A SECOND IMAGE APPARATUS

(75) Inventor: Kazuo Endo, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,050

(22) Filed: Aug. 25, 1997

(30) Foreign Application Priority Data

Aug. 30, 1996 (JP) ..................................... 8-248860

(51) Int. Cl.$^7$ ....................................... H04N 9/73
(52) U.S. Cl. ........................................... 348/223; 348/188
(58) Field of Search ..................... 348/223, 224, 348/225, 239, 649, 650, 651, 652, 187, 188, 22; 382/130, 167

(56) References Cited

U.S. PATENT DOCUMENTS

| | | | |
|---|---|---|---|
| 4,763,186 | * | 8/1988 | Belmares-Sarabia et al. ...... 348/650 |
| 5,384,601 | * | 1/1995 | Yamashita et al. ................... 348/652 |
| 5,479,524 | * | 12/1995 | Farrell et al. ......................... 382/162 |
| 5,719,639 | * | 2/1998 | Imamura .............................. 348/650 |
| 5,821,993 | * | 10/1998 | Robinson ............................. 382/167 |
| 5,852,675 | * | 12/1998 | Matsuo et al. ....................... 382/167 |

\* cited by examiner

*Primary Examiner*—Tuan Ho
(74) *Attorney, Agent, or Firm*—Frommer Lawrence & Haug, LLP.; William S. Frommer; Darren M. Simon

(57) ABSTRACT

The invention provides a technique of making color correction by means of a simple operation so that the color difference among imaging apparatus is minimized for a particular color specified by a user. In the color correction operation, an MPU provided in a camera displays a marker on a viewfinder. A user controls a user interface so as to put the marker on a desired color of a color chart thereby selecting a color to be weighted. The MPU inputs data obtained by measuring the color chart via the camera and also inputs color reference data obtained by measuring the same color chart under the same conditions via another camera serving as a reference camera. The MPU determines the coefficients of a linear matrix circuit for making color correction by means of a calculation with a weight specified by the user. The resultant coefficients are set in the linear matrix circuit.

7 Claims, 5 Drawing Sheets

COLOR CORRECTION APPARATUS FOR MATCHING COLORS IN A SIGNAL OUTPUT FROM A FIRST IMAGE APPARATUS WITH THOSE FROM A SECOND IMAGE APPARATUS

BACKGROUND OF THE INVENTION

1. Field of the Invention

The present invention relates to a color correction apparatus which is used in an imaging apparatus to make compensation for color difference from apparatus to apparatus.

2. Description of the Related Art

In video cameras for use in broadcast stations, it is required that the color characteristics of each video camera be precisely adjusted. However, in imaging apparatus such as video cameras for use in broadcast stations, a difference in the output image can occur among cameras due to slight variations in spectral characteristics of color filters or color separation prisms disposed in front of an image sensor device such as a CCD (charge coupled device). To avoid the above problem, the inventors of the present invention have proposed a technique of making color adjustment for each video camera using a linear matrix camera which is generally disposed in the video camera for use in broadcast stations. The linear matrix circuit serves to electronically compensate for an error in the color of the reproduced image caused by the difference in the spectral characteristic between the video camera and the ideal spectral characteristic for example according to the NTSC standard. In this technique of compensating for the color difference among video cameras using the linear matrix circuit, the same colors for example colors of a color chart are measured by two different imaging apparatus, and the coefficients of the linear matrix circuit are determined by means of calculation based on the data of the colors so that the differences in the colors between the two imaging apparatus are minimized. The resultant coefficients are given to the linear matrix circuit. Hereinafter, this process is referred to as a color setup process.

However, in the technique of compensating for the color differences by determining the coefficients of the linear matrix circuit on the basis of the measurement of particular colors so that the color differences are minimized, although it is possible to adjust a few colors to nearly ideal colors, it is difficult to perfectly eliminate color differences among cameras for all colors. When a user is not satisfied with the result of the color setup process, it is required to manually make color adjustment to obtain better consistency. However, such a manual adjustment requires a very tedious and complicated procedure. Such the manual color adjustment is performed for example when it is desirable that a particular color such as a flesh color be adjusted precisely, or when a color a user desires to adjust precisely is not found in the color chart. In general, the flesh color is frequently specified as a color to be adjusted precisely. However, the standard of the flesh color varies from a broadcast station to another around the world, and therefore the adjustment of the flesh color which is not included in the color chart is generally performed manually, spending a long time.

In view of the above problems, it is an object of the present invention to provide a color correction apparatus for use in an imaging apparatus, capable of adjusting arbitrary desired colors so as to minimize the color differences from an imaging apparatus to another by means of simple operations.

SUMMARY OF THE INVENTION

According to a first aspect of the present invention, there is provided a color correction apparatus for use in an imaging apparatus, the imaging apparatus including imaging means for sensing the image of a subject and generating a signal including information about the color of the subject, the color correction apparatus comprising: color correction means for correcting the signal generated by the imaging means in the image sensing operation by means of a predetermined calculation so that the color represented by the signal generated by the imaging means in the image sensing operation is adjusted relative to a reference color; specifying means for specifying a color which is adjusted by the color correction means relative to the reference color; and calculation procedure determining means for determining the calculation procedure, which is performed by the color correction means, on the basis of the signal which is generated when sensing the color specified by the specifying means and also the reference signal associated with the specified color so that the color represented by the signal which is generated by the imaging means when sensing in particular the specified color is corrected relative to the reference color.

According to a second aspect of the present invention, there is provided a color correction apparatus for use in an imaging apparatus, the imaging apparatus including imaging means for sensing the image of a subject and generating a signal including information about the color of the subject, the color correction apparatus comprising: color correction means for correcting the signal generated by the imaging means in the image sensing operation by means of a predetermined calculation so that the color represented by the signal generated by the imaging means in the image sensing operation is adjusted relative to a reference color; specifying means for specifying a color which is weighted; and calculation procedure determining means for determining the calculation procedure, which is performed by the color correction means, on the basis of signals which are generated by the imaging means when sensing particular colors and also the reference signal associated with the particular colors while weighting the color specified by the specifying means so that the colors represented by the signals which are generated by the imaging means are corrected relative to the reference colors.

In the color correction apparatus according to the first aspect of the invention, a color which should be adjusted relative to a reference color is specified by the specifying means, and the calculation procedure determining means determines the calculation procedure which is performed by the color correction means to adjust the color represented by the signal generated by the imaging means in the operation of sensing the image of the specified color with respect to the reference color, wherein the calculation procedure is performed on the basis of the signal generated by the imaging means in the operation of sensing the specified color and also the signal generated for the reference color with respect to which the color specified by the specifying means is to be adjusted. Then the color correction means makes color correction according to the calculation procedure determined.

In the color correction apparatus according to the second aspect of the invention, a color which should be weighted is specified by the specifying means, and the calculation procedure determining means determines the calculation procedure which is performed by the color correction means to adjust the color represented by the signal generated by the imaging means in the operation of sensing the image of the specified color with respect to the reference color, wherein the calculation procedure is determined so that the calculation procedure is performed on the basis of the signal generated by the imaging means in the operation of sensing the color specified by the specifying means and also the signal generated for the reference color with respect to which the color specified by the specifying means is to be adjusted while weighting the color specified by the specifying means. Then the color correction means makes color correction according to the calculation procedure determined.

DESCRIPTION OF THE PREFERRED EMBODIMENTS

Figure 1:
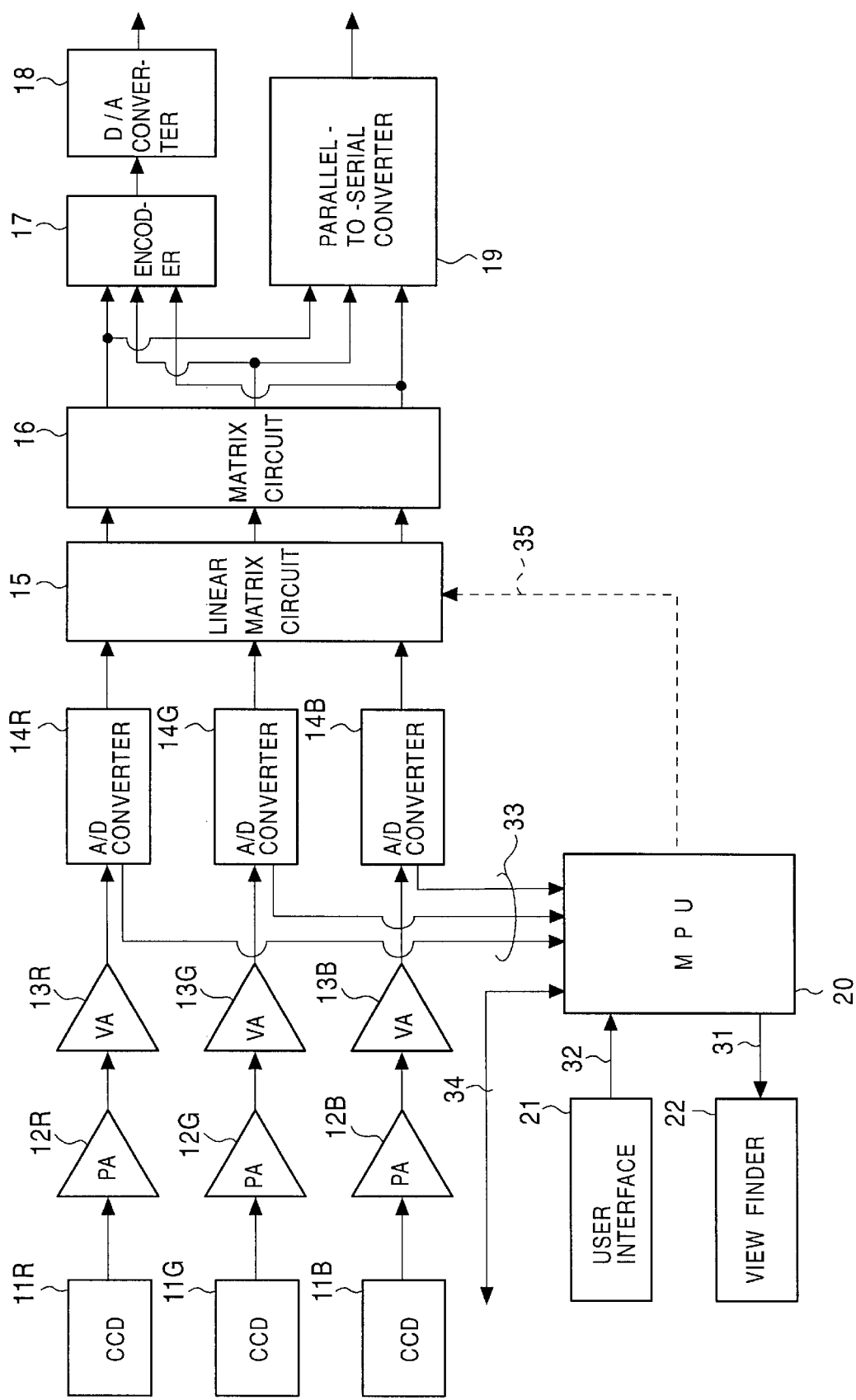
FIG. 1 is a block diagram illustrating a video camera including a color correction apparatus embodying the present invention.

The present invention is described in further detail below with reference to preferred embodiments in conjunction with the accompanying drawings. FIG. 1 is a block diagram illustrating a video camera including a color correction apparatus for use in an imaging apparatus (hereinafter referred to simply as a color correction apparatus) embodying the present invention. This video camera includes three CCDs 11R, 11G, and 11B serving as image sensor devices. Light from a subject is separated into red, green, and blue light rays by an imaging optical system including color filters or color separation prisms (not shown). The separated red, green, and blue light rays are focused on the CCDs 11R, 11G, and 11B, respectively. The CCDs 11R, 11G, and 111B sense the red image, green image, and blue image, respectively, and generate a corresponding red signal, green signal, and blue signal, respectively.

The video camera shown in FIG. 1 further includes: preamplifiers (denoted as PA in FIG. 1) 12R, 12G, and 12B for amplifying the red, green, and blue signals output by the CCDs 11R, 11G, and 11B; video amplifiers (denoted as VA in FIG. 1) 13R, 13G, and 13B for making adjustment on the output signals of the preamplifiers 12R, 12G, and 12B so that a correct black level and white level are obtained; analog-to-digital (hereinafter referred to simply as A/D) converters 14R, 14G, and 14B for converting the output signals of the video amplifiers 13R, 13G, and 13B into digital form; a linear matrix circuit 15 for making color correction on the output signals of the A/D converters 14R, 14G, and 14B; a matrix circuit 16 for generating a luminance signal, a red color difference signal, and a blue color difference signal on the basis of the red signal, the green signal, and the blue signal generated by the linear matrix circuit 15; an encoder 17 which receives the output signals of the matrix circuit 16 and performs various processes on the received signals, such as color modulation, addition of a sync signal, and summation of the luminance signal and the color signals, thereby generating a color image signal according to the NTSC standard or the PAL standard; a digital-to-analog (hereinafter referred to as D/A) converter 18 for converting the output signal of the encoder 17 to an analog composite signal; and a parallel-to-serial converter 19 for converting the output signals of the matrix circuit 16 from parallel form into serial form and then outputting the resultant signal as a serial digital signal.

The video camera shown in FIG. 1 further includes: a microprocessor unit (hereinafter referred to as a MPU) 20 for controlling the entire parts, including the color correction apparatus, of the video camera; a user interface 21 connected to the MPU 20, via which a user can enter a command; and a viewfinder 22 connected to the MPU 20, which serves to display not only the image of the subject but also various menus used by a user to issue various commands and a marker used in a color setup process which will be described later. The user interface 21 includes a switch and a dial. The viewfinder 22 may be realized for example with a liquid crystal display device.

The operation of the video camera shown in FIG. 1 is briefly described below. In this video camera, the red signal, the green signal, and the blue signal output by the CCDs 11R, 11G, and 11B are amplified by the preamplifiers 12R, 12G, and 12B, respectively, and then adjusted in the black level and the white level by the video amplifiers 13R, 13G, and 13B. The output signals of the video amplifiers 13R, 13G, and 13B are applied to the A/D converters 14R, 14G, and 14B and converted to digital signals. The resultant signals are input to the linear matrix circuit 15. The linear matrix circuit 15 performs color correction on the received signals by means of a matrix operation using coefficients determined by the color setup process which will be described later. From the red signal, the green signal, and the blue signal output by the linear matrix circuit 15, the matrix circuit 16 generates a luminance signal, a red color difference signal, and a blue color difference signal. The generated signals are applied to the encoder 17 and the parallel-to-serial converter 19. The encoder 17 performs various processes on the output signals of the matrix circuit 16, such as color modulation, addition of a sync signal, and summation of the luminance signal and the color signals, thereby generating a color image signal according to the NTSC standard or the PAL standard. The resultant color image signal is applied to the D/A converter 18 and converted to an analog signal which is output as an analog composite signal. On the other hand, the output signals of the matrix circuit 16 applied to the parallel-to-serial converter 19 are converted from parallel form to serial form, and the resultant signal is output as a serial digital signal. The color setup process performed by the MPU 20 will be described in detail later.

In addition to those components shown in FIG. 1, the video camera further includes an edge enhancement circuit for performing edge enhancement, a knee circuit for compressing signals in a high-brightness range, a gamma correction circuit for making gamma correction, etc., although they are not shown in FIG. 1.

In the video camera shown in FIG. 1, the color correction apparatus of the present embodiment of the invention is constructed with the linear matrix circuit 15, the MPU 20, the user interface 21, and the viewfinder 22.

In the color setup process, the MPU 20 outputs predetermined data 31 to be displayed to the viewfinder 22, and receives a user control signal 32 from the user interface 21. The MPU 20 also receives the output signals of the A/D converters 14R, 14G, and 14B as measurement data 33. Furthermore, color reference data 34 is transmitted between the MPU 20 and a camera control unit (hereinafter referred to as a CCU) which will be described later. The MPU 20 outputs linear matrix control data 35 to the linear matrix circuit 15. The MPU 20 includes a CPU (central processing unit), a ROM (read only memory), and a RAM (random access memory), and the MPU 20 executes a program stored in the ROM using the RAM as a working area so as to accomplish not only the color setup process which will be described below but also the control over the entire parts of the vide camera.

Figure 2:
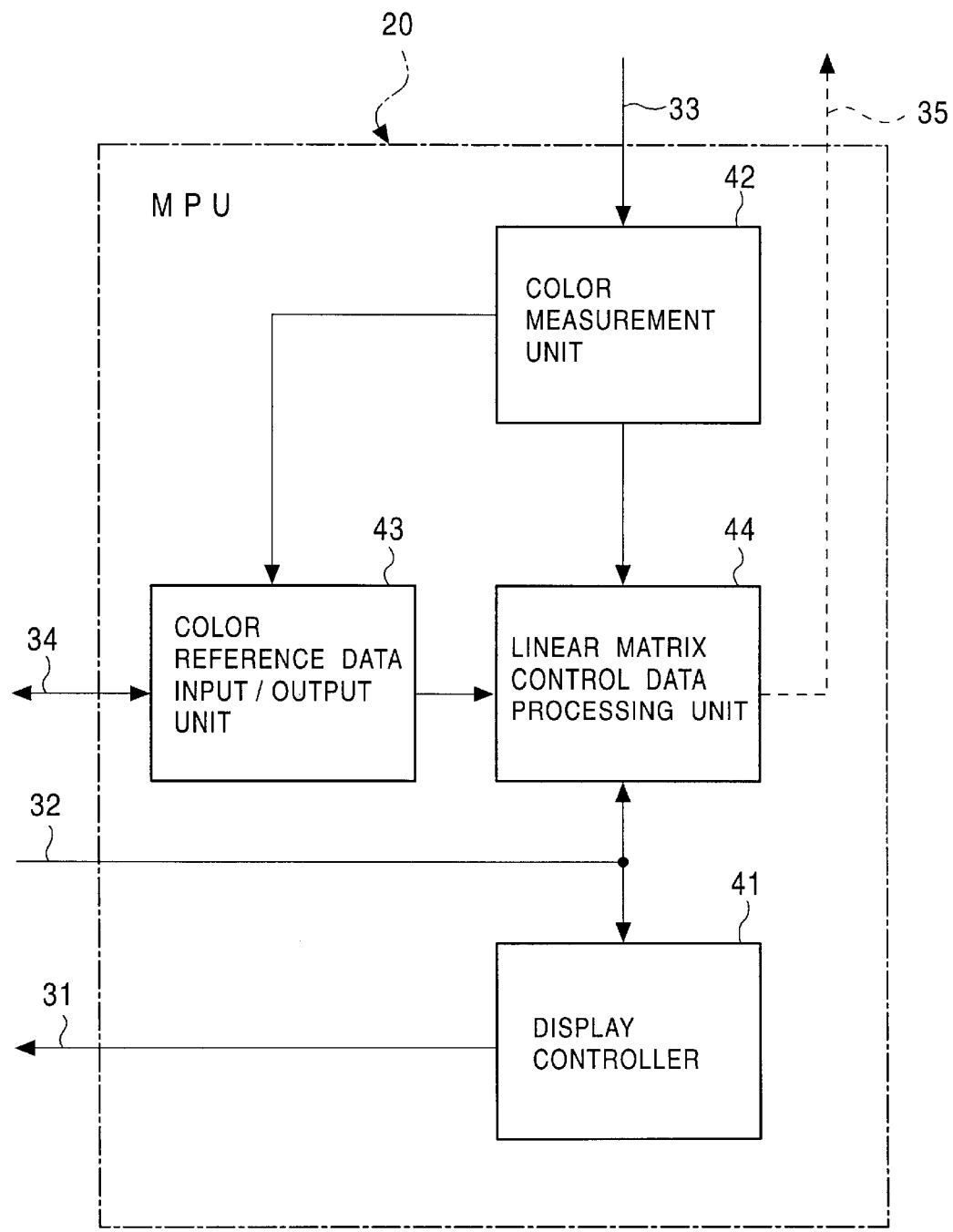
FIG. 2 is a functional block diagram associated with the color setup process performed by the MPU shown in FIG. 1.

FIG. 2 is a functional block diagram associated with the color setup process performed by the MPU 20. As shown in FIG. 2, the MPU 20 includes: a display controller 41 which receives a user control signal 32 and outputs data 31 to be displayed to the viewfinder 22 thereby controlling the contents displayed on the viewfinder 22; a color measuring unit 42 which receives measurement data 33 and measures each color of the color chart which will be described later, and which is also used to measure the color of an arbitrary designated part of an arbitrary subject; a color reference data input/output unit 43 serving to output the color data measured by the color measuring unit 42 as color reference data 34 to the CCU and also serving to input the color reference data 34 from the CCU; and a linear matrix control data processing unit 44 which receives the color reference data 34 via the color reference data input/output unit 43, the color data measured by the color measuring unit 42, and the user control signal 32, and then calculates, from those received data, the coefficients used in the linear matrix circuit 15 and outputs the resultant coefficients as linear matrix control data 35 to the linear matrix circuit 15.

Figure 3:
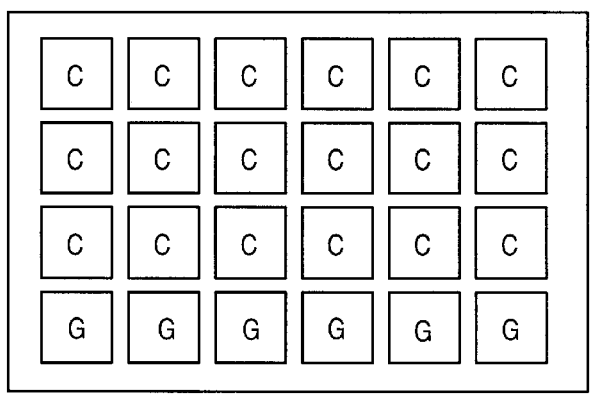
FIG. 3 is a schematic diagram illustrating a color chart used in the color correction apparatus according to the embodiment of the invention.

Referring now to FIG. 3, the color chart used in the present embodiment is described below. A Macbeth color chart (trade name) or the like is generally employed as the color chart. FIG. 3 illustrates an example of a color chart. The color chart has 24 cells separated from each other and arranged in an array form. In FIG. 3, eighteen square cells denoted by C are colored into different chromatic colors. On the other hand, six square cells denoted by G are colored into achromatic colors such as white, gray, and black having different brightness. The symbols C and G are presented in the figure only for convenience of description, and the practical color chart has no such symbols. In the color measurement process with the color chart, white and black data is obtained by measuring the achromatic color cells, and color data is obtained by measuring the chromatic color cells.

Figure 4:
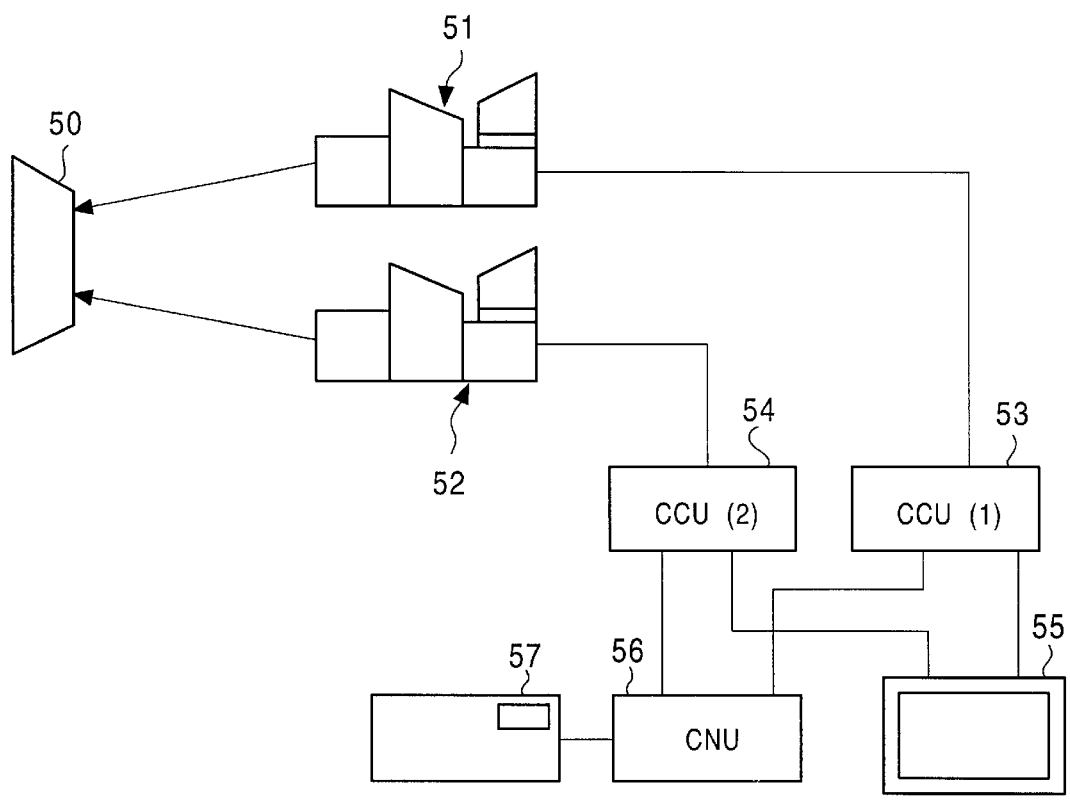
FIG. 4 is a block diagram illustrating an example of a system configuration used in the color setup process according to the embodiment of the invention.

FIG. 4 illustrates an example of a system configuration used in the color setup process according to the present embodiment of the invention. In this specific example, a color adjustment is made between two video cameras, that is, between a camera (1) 51 and a camera (2) 52, with reference to the camera (1) 51. The cameras 51 and 52 are constructed as shown in FIG. 1. The cameras 51 and 52 are connected to the CCU (1) 53 and the CCU (2) 54, respectively, which are responsible for controlling the transmission of video data and control data. The CCUs 53 and 54 are also connected to a monitor 55 for displaying an image in accordance with a video signal received from the CCU 53 or 54. Furthermore, the CCUs 53 and 54 are connected to a master setup unit (hereinafter referred to as an MSU) 57 via a command network unit (hereinafter referred to as a CNU) 56. The MSU 57 controls sequential operations in the color setup process. Under the control of the MSU 57, the CNU 56 selects either the CCU (1) 53 or the CCU (2) 54 as the destination of the control data.

In the color setup process using the system shown in FIG. 4, the same color chart 50 is measured by the cameras 51 and 52 under the same conditions. Although, in FIG. 4, the color chart 50 is measured by the cameras 51 and 52 at the same time from different positions, this is only for convenience in description. In practice, the color chart 50 is measured by the cameras 51 and 52 from the same position. More specifically, the camera 51 is set on a tripod and the color chart 50 is measured by the camera 51. After that the camera 51 on the tripod is replaced by the camera 52 while maintaining the tripod at the same position, and the same color chart 50 is measured by the camera 52. When the color chart 50 is measured by the camera 51 or 52, a user adjusts the camera direction so that the image of the color chart 50 is correctly taken by the camera.

Figure 6:
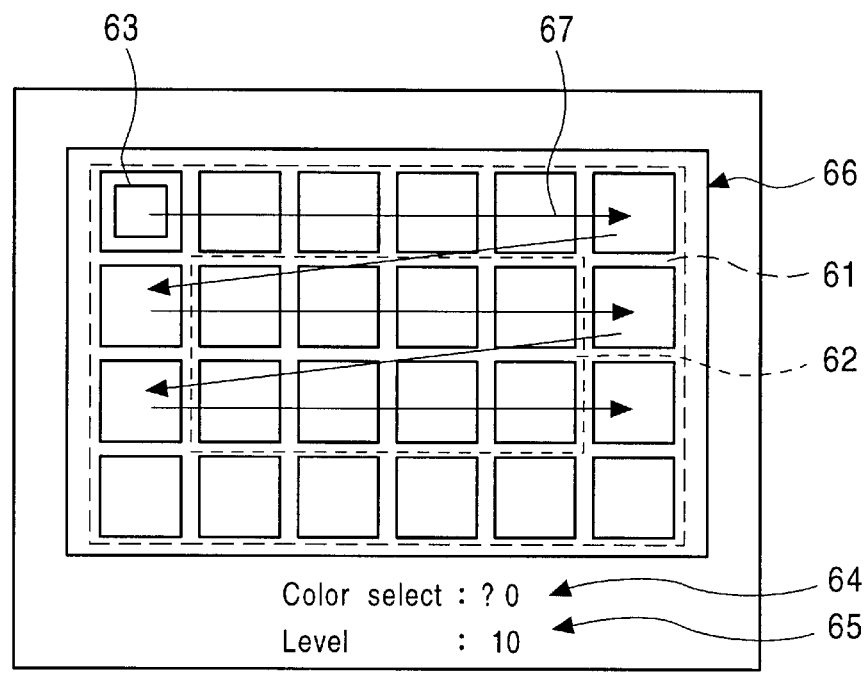
FIG. 6 is a schematic diagram illustrating an image which is displayed on the viewfinder during the color setup process performed with the color correction apparatus according to the embodiment of the invention.

Referring to FIG. 6, the image displayed on the viewfinder 22 during the color setup process, and the method of adjusting the camera direction to the color chart 50 will be described below. FIG. 6 illustrates an image of the color chart 50 taken by the camera and displayed on the viewfinder 22 in the color setup process. In FIG. 6, the image of the color chart 50 is denoted by reference numeral 66. As shown in FIG. 6, when a user issues a command telling that the color setup process should be started, the display controller 41 of the MPU 20 displays an outer frame 61 and an inner frame 62 serving as color chart positioning frames on the viewfinder 22. The outer frame 61 is a rectangular line which is aligned with the outer peripheral line surrounding the sixteen square cells located at peripheral positions of the color chart. The inner frame 62 is a rectangular line which is aligned with the inner peripheral line surrounded by the same sixteen square cells. The camera direction can be adjusted to the color chart 50 by aligning the outer frame 61 with the outer peripheral line surrounding the sixteen square cells located at peripheral positions of the color chart, and aligning the inner frame 62 with the inner peripheral line surrounded by the same sixteen square cells.

In the color setup process, if the user enters a command to tell that weighting should be performed on a color of the color chart, a color selection marker 63 for selecting a color to be weighted, a marker position number indication area 64, and a weighting level indication area 65 are also displayed on the viewfinder 22, as shown in FIG. 6.

The color selection marker 63 is used by the user to select a color to be weighted from the colors of the color chart. More specifically, when the camera position is adjusted toward the color chart 50 in the above-described manner, the color selection marker 63 is formed by a rectangular line with a size smaller than the size of one cell of the color chart. For example, if the user turns the dial provided in the user interface 21, the color selection marker 63 moves from cell to cell over the eighteen chromatic color cells of the color chart along the path denoted by reference numeral 67. The color selection marker 63 may move in an opposite direction along the path denoted by reference numeral 67, when, for example, the user turns the dial of the user interface 21 in the opposite direction.

The number of the chromatic color cell at which the color selection marker 63 is located is displayed in the marker position number indication area 64, wherein the number of the cell is defined such that it increases by 1 from cell to cell starting with 0 at the top and extreme left along the path denoted by reference numeral 67.

The weighting level specified by the user via the user interface 21 is indicated in the weighting level indication area 65. In this specific embodiment, the weighting level is defined within the range from level −1 to level 16. When level −1 is selected for a particular color, the coefficients of the linear matrix circuit 15 are calculated without using the measurement data about that color. In level 0, the coefficients associated with the linear matrix circuit 15 are calculated taking into account the measurement data of the color to a normal degree. On the other hand, in level n (n=1, . . . , 16), the coefficients associated with the linear matrix circuit 16 are calculated taking into account the measurement data of the color to a degree (n+1) times higher than in the case of level 0. As the weighting level associated with a particular color increases, the coefficients of the linear matrix circuit 15 are calculated so that the error in that color among cameras is reduced to a lower level. The weighting level may be input for example by turning the dial provided in the user interface 21. The default for the weighting level is level 0. If the user properly assigns level −1 to particular colors, it is possible to select a desired color from the colors of the color chart so that the coefficients of the linear matrix 15 are calculated using the measurement data corresponding to the selected color in such a manner that the selected color is corrected relative to the reference color.

Figure 7:
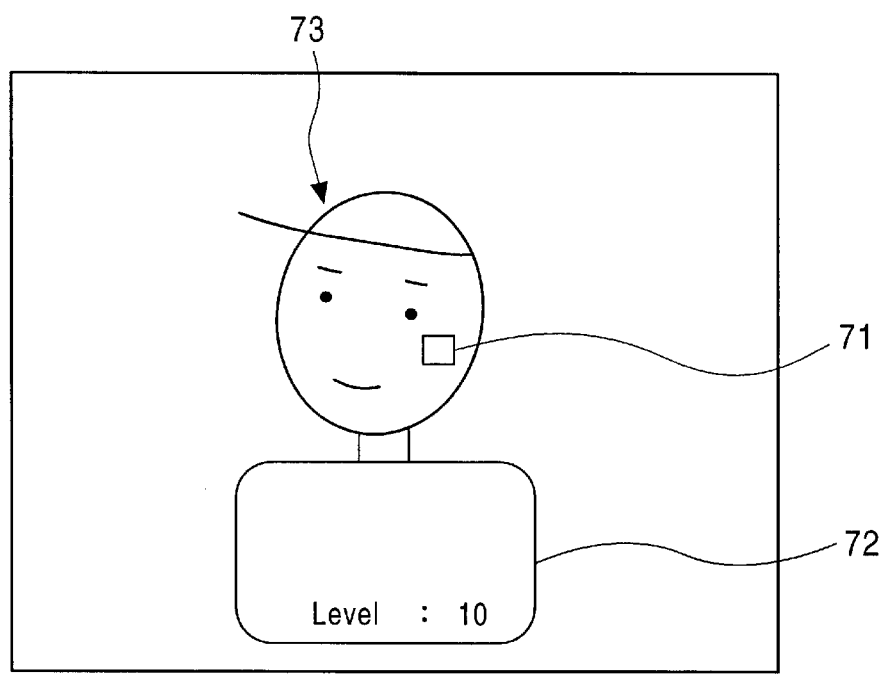
FIG. 7 is a schematic diagram illustrating another image which is displayed on the viewfinder during the color setup process performed with the color correction apparatus according to the embodiment of the invention.

In the color setup process, if the user enters a command telling that a color should be measured for an arbitrary designated part of an arbitrary subject, a weighting level indication area 72 and a color measurement marker 71 for designating the part of the subject 73 whose color should be measured are displayed on the viewfinder 22 as shown in FIG. 7. The color measurement marker 71 may be for example a rectangular line. The user can move the color measurement marker 71 within the screen of the viewfinder by controlling the user interface 21. The weighting level indication area 72 is similar to the weighting level indication area 65 shown in FIG. 6.

Figure 5:
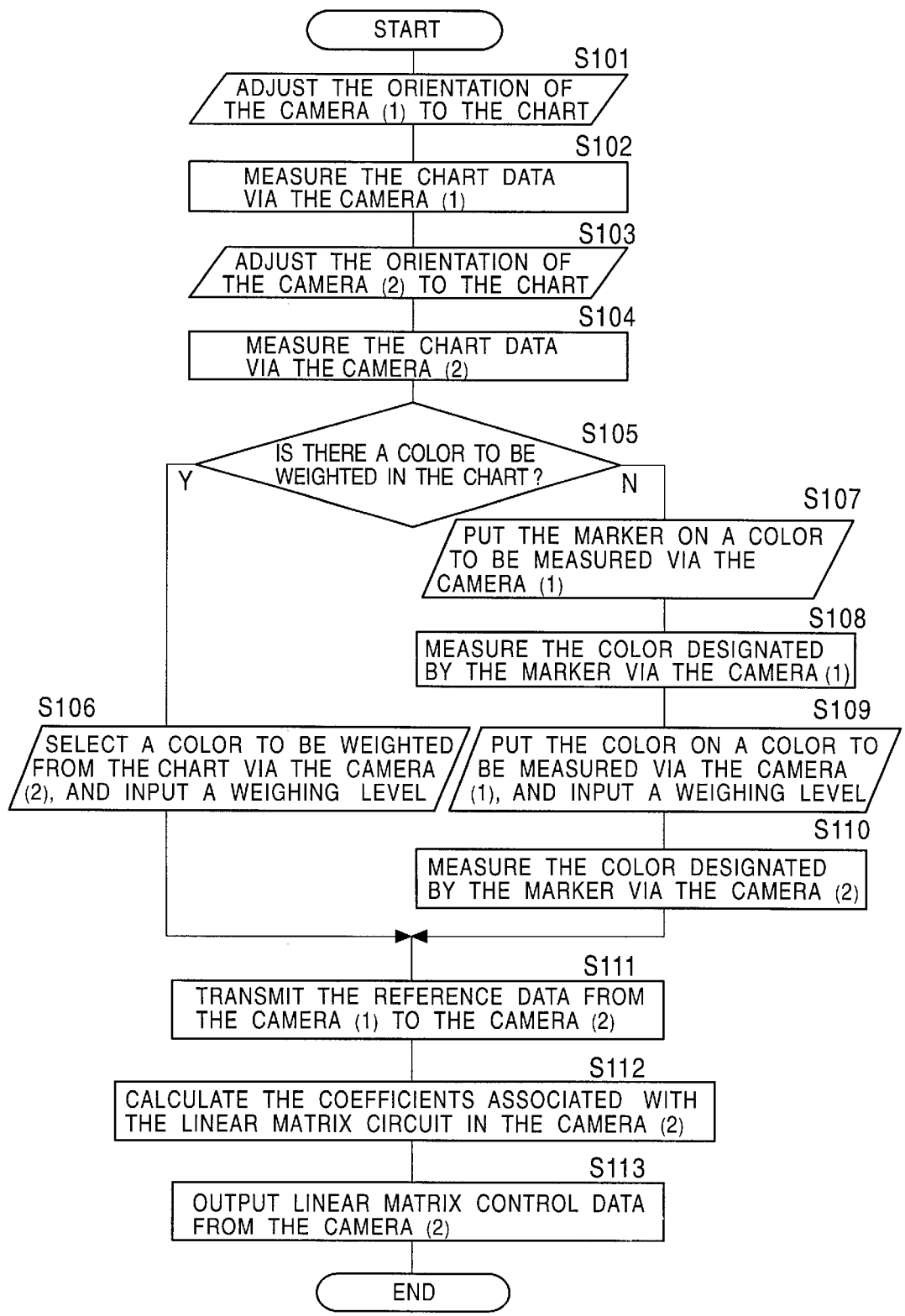
FIG. 5 is a flowchart illustrating the operation of the color correction apparatus according to the embodiment of the invention.

Referring now to FIG. 5, the operation of the color correction apparatus according to the present embodiment of the invention is described below. FIG. 5 is a flowchart illustrating the color setup process performed by the system shown in FIG. 4. At the first step (S101) in the color setup process, the user captures an image of the color chart 50 via the camera (1) 51, and issues a command via the user interface 21 to tell that the color setup process should be started. The position of the camera (1) 51 is then adjusted to the correct direction toward the color chart 50 as described above with reference to FIG. 6. Then (in step S102), the user issues a command via the user interface 21 to tell that the measurement of the chart data should be started. In response, the color measurement unit 42 in the MPU 20 of the camera (1) 51 inputs the output signals of the A/D converters 14R, 14G, and 14B as the measurement data 33, and measures the colors of the respective chromatic color cells of the color chart 50 using the measurement data 33 thereby generating chart data. The resultant chart data is output as color reference data 34 to the CCU (1) 53 via the color reference data input/output unit 43.

In the next step (S103), as in the case of the camera (1), the user captures the color chart 50 via the camera (2) 52, and issues a command via the user interface 21 to tell that the color setup process should be started. The position of the camera (2) 52 is then adjusted to the correct direction toward the color chart 50. Then (in step S104), the user issues a command via the user interface 21 to tell that the measurement of the chart data should be started. In response, the color measurement unit 42 in the MPU 20 of the camera (2) 52 inputs the output signals of the A/D converters 14R, 14G, and 14B as the measurement data 33, and measures the colors of the respective chromatic color cells of the color chart 50 using the measurement data 33 thereby generating chart data. The resultant chart data is transmitted to the linear matrix control processing unit 44.

In the following step (S105), the user judges whether a desired color to be weighted is found in the color chart. If the color to be weighted is found in the color chart (that is, if the conclusion is yes), the user enters a command via the user interface 21 of the camera (2) 52 to tell that weighting is performed for some color of the color chart. In response, the display controller 41 of the MPU 20 displays the color selection marker 63, the marker position number indication area 64, and the weighting level indication area 65 on the viewfinder 22 as shown in FIG. 6. The user moves the color selection marker 63 by controlling the user interface 21 so as to select a color to be weighted from the color chart. The user also inputs a weighting level for the selected color (step S106). The selection of the color to be weighted may be accomplished for example by pressing a particular switch of the user interface 21 after putting the color selection marker 63 on the desired color of the image of the color chart. The number of colors which can be weighted may be limited to one or other particular number. Instead, all colors of the color chart may be allowed to be weighted. The weighting operation (in step S106) may be automatically ended when weighting is completed for the allowed number of colors designated by the user. Alternatively, the weighting operation in step S106 may be ended when the user enters a command via the user interface 21 to tell that the weighting operation should be ended.

When no particular weighting is desired, after the user enters a command telling that weighting is performed for some color of the color chart, the weighting operation can be ended immediately without performing weighting operation. In this case, the default weighting level or level 0 is employed for all the colors of the color chart. Alternatively, the user may issue a command telling that no weighting should be performed.

Furthermore, in step S106, an arbitrary desired color may be set to level −1 so that the coefficients of the linear matrix circuit 15 are calculated without using the measurement data corresponding to the that color. This makes it possible to select a color from the color chart so that the measurement data corresponding to the selected color is used in the calculation of the coefficients of the linear matrix circuit 15 thereby designating the color as a color to be corrected relative to the reference color.

On the other hand, if it is concluded in step S105 that a color to be weighted is not found in the color chart (that is, the conclusion is no), the user enters a command via the user interface 21 to tell that the color of an arbitrary desired portion of an arbitrary subject specified by the user should be measured by the camera (1) 51 and the camera (2) 52. In response, the display controller 41 of the MPU 20 displays the color selection marker 71 and the weighting level indication area 72 on the viewfinder 22 of the camera (1) 51 and the camera (2) 52 as shown in FIG. 7. The user adjusts the direction of the camera (1) 51 to a desired subject, and selects a desired part of the subject whose color is to be measured by putting the color selection marker 71 on that part (step in S107). Then in the next step (S108), if the user enters a command via the user interface 21 to tell that the measurement of the color should be started, the color measurement unit 42 of the camera (1) 51 inputs the output signals of the A/D converters 14R, 14G, and 14B as the measurement data 33, and measures the color of the portion of the subject designated by the color measurement marker 71 on the basis of the measurement data 33. The data of that color is output as color reference data 34 to the CCU (1) 53 via the color reference data input/output unit 43. In the next step (S109), as in the case of the camera (1), the user adjusts the direction of the camera (2) 52 to the same subject, and selects the same part of the subject as that selected in the camera (1) 51 by putting the color selection marker 71 on that part. If desired, the user may input a weighting level. Then in the next step (S110), if the user enters a command via the user interface 21 to tell that the measurement of the color should be started, the color measurement unit 42 of the camera (2) 52 inputs the output signals of the A/D converters 14R, 14G, and 14B as the measurement data 33, and measures the color of the portion of the subject designated by the color measurement marker 71 on the basis of the measurement data 33. The resultant color data is transmitted to the linear matrix control data processing unit 44.

If the cameras 51 and 52 have the capability, such as the automatic hue adjustment capability, of measuring the color of an arbitrary desired part of an arbitrary subject designated by a user, steps S108 and S110 may be performed using this capability.

After completion of step S108 or S110, the color reference data 34 output by the camera (1) 51 is transmitted to the camera (2) 52 via the CCU (1) 53, CNU 56, and the CCU (2) 54, and the camera (2) 52 inputs the color reference data 34 from the camera (1) 51 (in step S111). In the camera (2) 52, the color reference data 34 is transmitted to the linear matrix control data processing unit 44 via the color reference data input/output unit 43 in the MPU 20.

Then in the following step (S112), the linear matrix control data processing unit 44 of the camera (2) 52 determines the coefficients of the linear matrix circuit 15 by means of calculation using the color reference data 34 supplied from the camera (1) 51, the data of the color measured by the color measurement unit 42, and the weighting level given by the user so that the color difference between the cameras 51 and 52 is minimized. The resultant coefficients are output as linear matrix control data 35 to the linear matrix circuit 15 (in step S113), and thus the color setup process is complete. After that, the linear matrix circuit 15 of the camera (2) 52 performs color correction by means of matrix calculation using the coefficients determined in the above color setup process. In this way, the color difference between the cameras 51 and 52 is compensated for.

A specific example of the procedure of the matrix calculation performed by the linear matrix circuit 15, and a specific example of the method of determining the coefficients of the linear matrix circuit 15 are described below.

In this specific example, the linear matrix circuit 15 performs the matrix calculation according to the following equation (1).

$$R' = R + C_0(R-G) + C_1(R-B)$$

$$G' = G + C_2(G-R) + C_3(G-B)$$

$$B' = B + C_4(B-R) + C_5(B-G) \qquad (1)$$

where R, G, and B are the input signal of the linear matrix circuit 15, R', G', and B' are the output signal of the linear matrix circuit 15, and $C_0$ to $C_5$ are the coefficients which are determined in the color setup process so that the color difference between the cameras 51 and 52 is minimized.

When an ith color is sensed by the camera (1) 51 serving as the reference camera, if the output signals of the A/D converters 14R, 14G, and 14B are given by $R_i'$, $G_i'$, and $B_i'$ and furthermore when the same ith color is sensed by the camera (2) 52 which is to be adjusted in terms of the color characteristics relative to the camera (1) 51, if the output signals of the A/D converters 14R, 14G, and 14B are given by $R_i$, $G_i$, and $B_i$, and if the weight for the error associated with the ith color is $W_i$, then the sum of squared errors is given by the following equation (2)

$$\Sigma E_i^2 = \Sigma W_i(R_i'-R_i)^2 + \Sigma W_i(G_i'-G_i)^2 + \Sigma W_i(B_i'-B_i)^2 \qquad (2)$$

In equation (2), the sum denoted by E should be calculated for all the colors measured in the color setup process. $R_i$, $G_i$, and $B_i$ in equation (2) correspond to R', G', and B' in equation (1). Furthermore, $W_i$ in equation (2) is given by $W_i = n+1$ where n denotes the weighting level selected by the user (from the values −1, 0, 1, . . . , 16).

If the coefficients $C_0$ to $C_5$ in equation (1) are determined so that the sum of squared errors represented by equation (2) is minimized, then the color difference between the cameras 51 and 52 is minimized. Thus, the linear matrix control data processing unit 44 in the MPU 20 of the camera (2) 52 determines the coefficients $C_0$ to $C_5$ in equation (1) using the method of least square so that the sum of squared errors represented by equation (2) is minimized. In this process, the coefficients $C_0$ to $C_5$ are determined so that the error for a specific color decreases with the increase in the weight $W_i$ assigned to that color in equation (2).

In the color correction apparatus according to the present embodiment of the invention, as described above, the color selection marker 63 or the color measurement marker 71 is displayed on the viewfinder 22 in the color setup process so that the user can select a color which should be adjusted relative to the reference color, select a color which should be weighted, and input a weighting level by controlling the user interface 21 while watching the viewfinder 22. This allows the user to precisely correct the color difference among imaging apparatus (video cameras) for a particular color in a quick and simple manner. Broadcast stations around the world have their own reference color such as the flesh color, which varies from a broadcast station to another. If some broadcast station employs a flesh color as its reference color which is not included in the color chart, it is required, in the conventional technique, to make color adjustment by means of manual operations, spending a long time. In contrast, the color correction apparatus according to the present embodiment of the invention makes it possible to adjust the flesh color which is not included in the color chart in a short time by means of simple operations.

Although the present invention has been described above with reference to the specific embodiment, the description is not to be construed in a limiting sense. For example, instead of the process shown in FIG. 5 in which either the operation of weighting a color selected from the color chart (step S106) or the operation of making color adjustment for the color of an arbitrary part of a subject (steps S107–S110) is selected and the selected operation is performed, both operations may be performed.

Furthermore, the weighting levels may be limited to two levels. In this case, the user may specifies whether weighting is performed or not without inputting the weighting level, and either of the two weighting levels may be automatically selected depending on the determination made by the user.

Alternatively, the user may only select a color from the color chart or specify a part of an arbitrary subject without inputting a weighting level, and the coefficients of the linear matrix circuit 15 may be calculated using only the measurement data associated with the color selected from the color chart or the color of the designated part of the subject.

Furthermore, although in the specific embodiment described above, color adjustment is performed between two cameras, color adjustment may be performed for a plurality of cameras with respect to a reference camera. Alternatively, each camera may include data of the respective colors of the color chart serving as reference data so that the coefficients of the linear matrix circuit 15 may be calculated using measured data and the above reference data.

In the color correction apparatus for use in an imaging apparatus according to the first aspect of the present invention, as described above, a particular color is specified via the specifying means, and the calculation procedure performed by the color correction means is determined so that the color represented by the signal which is generated when sensing the specified color via the imaging means is corrected relative to the reference color. Then, color correction is made according to the determined calculation procedure. This makes it possible to make color correction for a particular color specified by a user by means of simple operations thereby minimizing the color difference among imaging apparatus.

In the color correction apparatus for use in an imaging apparatus according to the second aspect of the present invention, a color to be weighted is specified via the specifying means, and the calculation procedure performed by the color correction means is determined on the basis of the signals which are generated when sensing particular colors and also the reference signals associated with those particular colors while weighting the color specified via the specifying means so that the colors represented by the signals generated by the imaging means are corrected relative to the reference colors. Then, color correction is made according to the determined calculation procedure. This makes it possible to make color correction for a particular color specified by a user by means of simple operations thereby minimizing the color difference among imaging apparatus.

What is claimed is:

1. A color correction apparatus for use with a first imaging apparatus which outputs a first video signal and a second imaging apparatus which outputs a second video signal, said color correction apparatus comprising:

specifying means for specifying reference colors in said second video signal which are to be weighted and for setting a weighting level for each of the specified reference colors, each said weighting level being settable such that no color correction is performed for the corresponding reference color;

color setup means for generating a set of weighted adjustment coefficients related to color differences between said first video signal and said second video signal using said weighting levels corresponding to said specified reference colors in which a minimum color difference occurs; and color correction means for correcting a plurality of colors of said first video signal by performing a calculation using the set of weighted adjustment coefficients, so that the corrected colors of said first video signal substantially match a corresponding plurality of colors in said second video signal output from the second imaging apparatus with the closest match occurring for said reference color.

2. A color correction apparatus according to claim 1, wherein said set of weighted adjustment coefficients are related to the color differences between a color chart imaged by said first imaging apparatus and said color chart imaged by said second imaging apparatus.

3. A color correction apparatus according to claim 2, wherein said set of weighted adjustment coefficients are further related to the color difference between a selected reference color from an arbitrary subject imaged by said first imaging apparatus and said arbitrary subject imaged by said second imaging apparatus.

4. A color correction apparatus according to claim 1, wherein said specifying means displays an index on a screen on which a color chart is imaged by said second imaging apparatus so that said reference colors to be weighted can be selected from the color chart using said index.

5. A color correction apparatus according to claim 4, wherein said specifying means also displays an alignment frame for aligning said index with said color chart imaged on said screen.

6. A color correction apparatus according to claim 1, wherein said specifying means displays an index on a screen on which an arbitrary subject is imaged by said second imaging apparatus so that a part of said arbitrary subject whose color is to be weighted can be specified using said index.

7. A color correction apparatus according to claim 1, further comprising storing means located in said first imaging apparatus for storing said set of weighted adjustment coefficients and wherein said color correction means performs said calculation using the stored set of weighted adjustment coefficients.

* * * * *